Feb. 13, 1951  V. PALUMBO  2,541,480
MACHINE FOR PRODUCING CAM GROOVES
OR THE LIKE IN CYLINDRICAL WORK
Filed Sept. 7, 1945  6 Sheets-Sheet 1

INVENTOR.
Vincent Palumbo
BY
Hull & West
ATTYS.

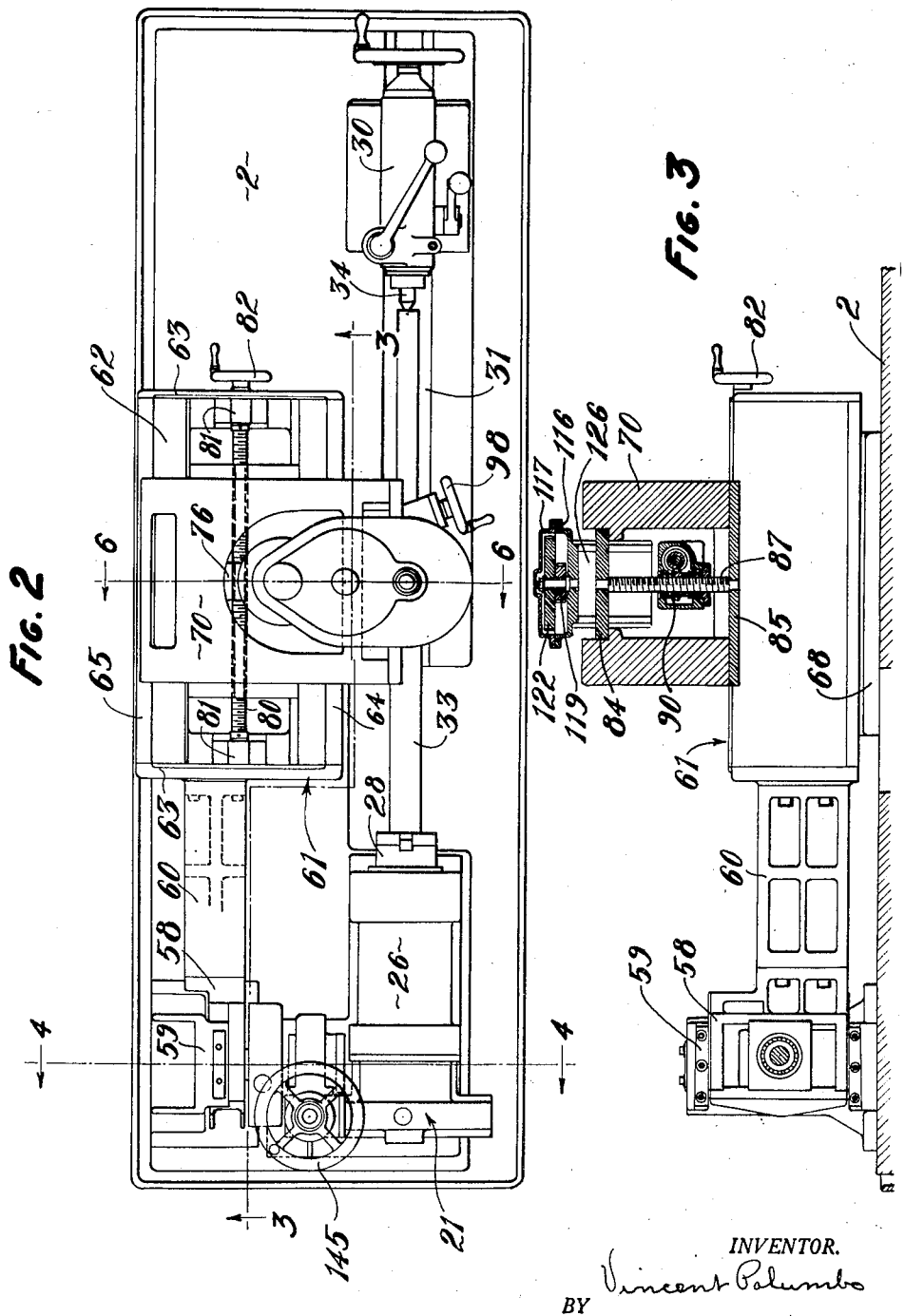

INVENTOR.
Vincent Palumbo
BY Hull & West
ATTYS.

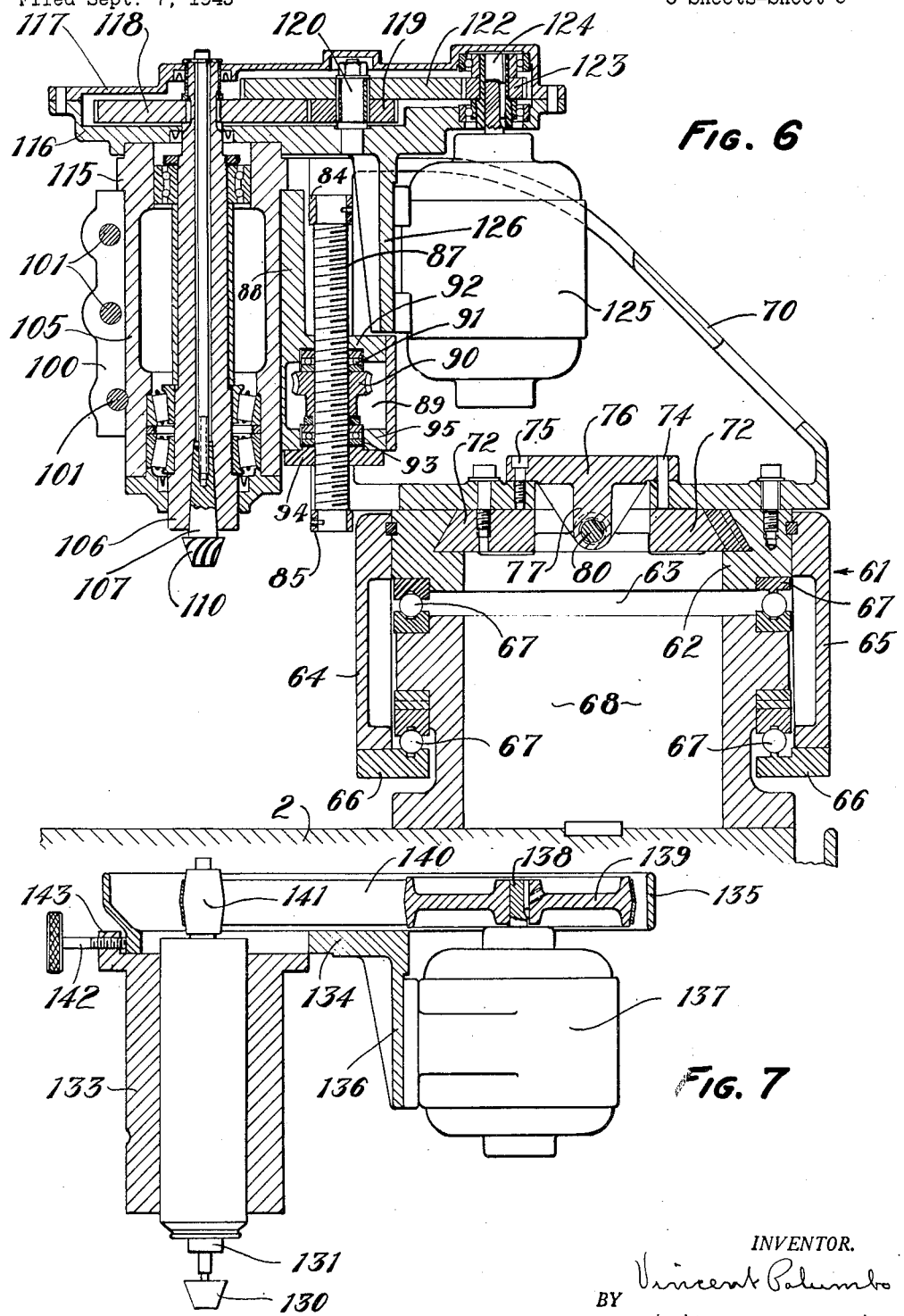

Feb. 13, 1951 V. PALUMBO 2,541,480
MACHINE FOR PRODUCING CAM GROOVES
OR THE LIKE IN CYLINDRICAL WORK
Filed Sept. 7, 1945 6 Sheets-Sheet 6

INVENTOR.
Vincent Palumbo
BY Hull West
ATTYS.

Patented Feb. 13, 1951

2,541,480

UNITED STATES PATENT OFFICE 2,541,480

MACHINE FOR PRODUCING CAM GROOVES OR THE LIKE IN CYLINDRICAL WORK

Vincent Palumbo, Cleveland, Ohio

Application September 7, 1945, Serial No. 614,925

6 Claims. (Cl. 90—11.64)

This invention relates to improvements in the class of machines used for cutting endless grooves that are characterized by a series of alternating turns, or that are of a zig-zag nature, in the peripheral surfaces of cylindrical bodies.

The principal object of the present invention is to provide a machine by which the cam member that constitutes the subject matter of Letters Patent No. 2,347,364, granted to me April 25, 1944, may be grooved with absolute precision. It will be obvious to those skilled in the art, however, that the machine may be used for other purposes, as for the cutting of oil grooves in cylindrical bearing parts, etc.

Another object is to provide a construction wherein the reciprocating parts, while freely movable, are held without vibration to an absolutely accurate path of movement.

A further object is to provide an adjustment by which the stroke of the tool supporting carriage may be easily and quickly changed, thereby to alter the length of the undulations of the groove in a direction axially of the work.

These objects, with others hereinafter appearing, are attained in the machine illustrated in the accompanying drawings, in which—

Figure 1:
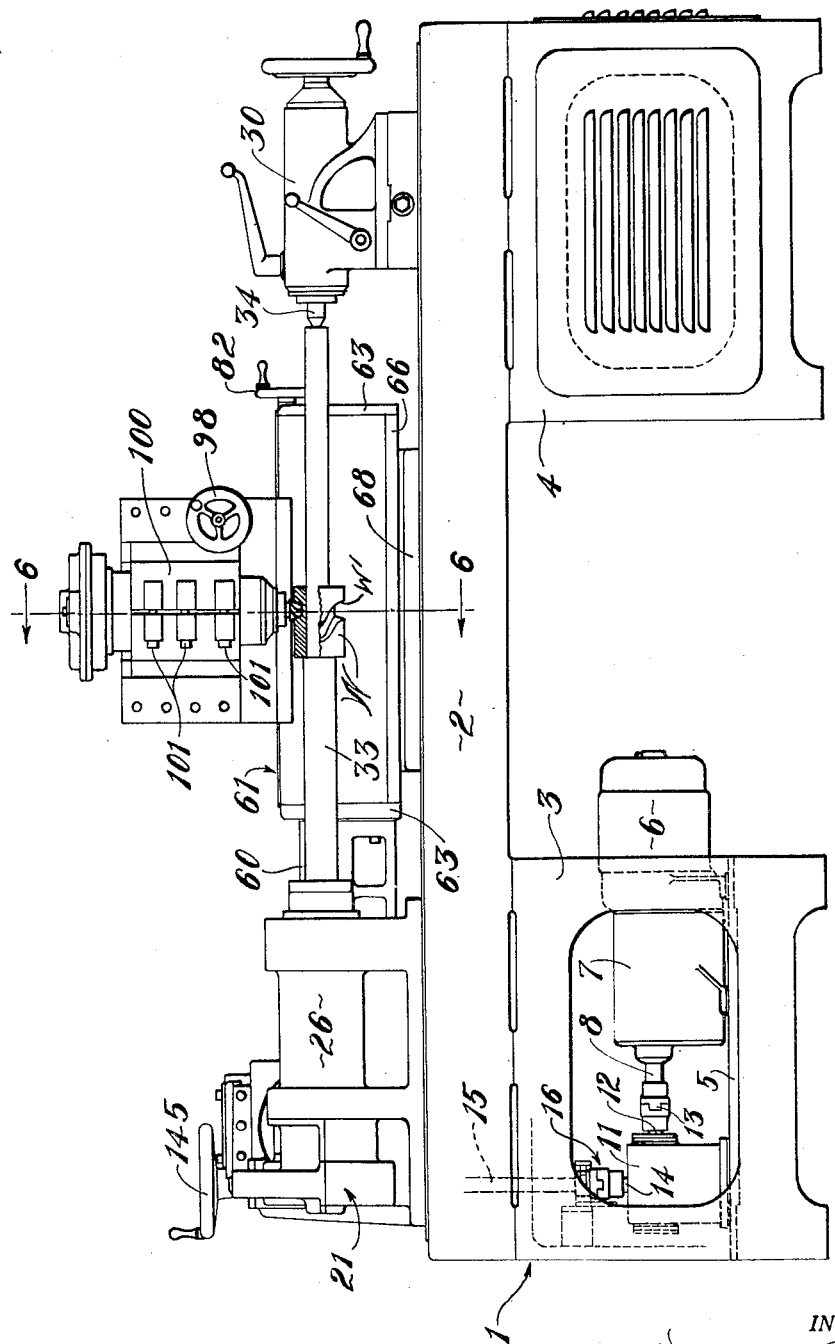
Figure 4:
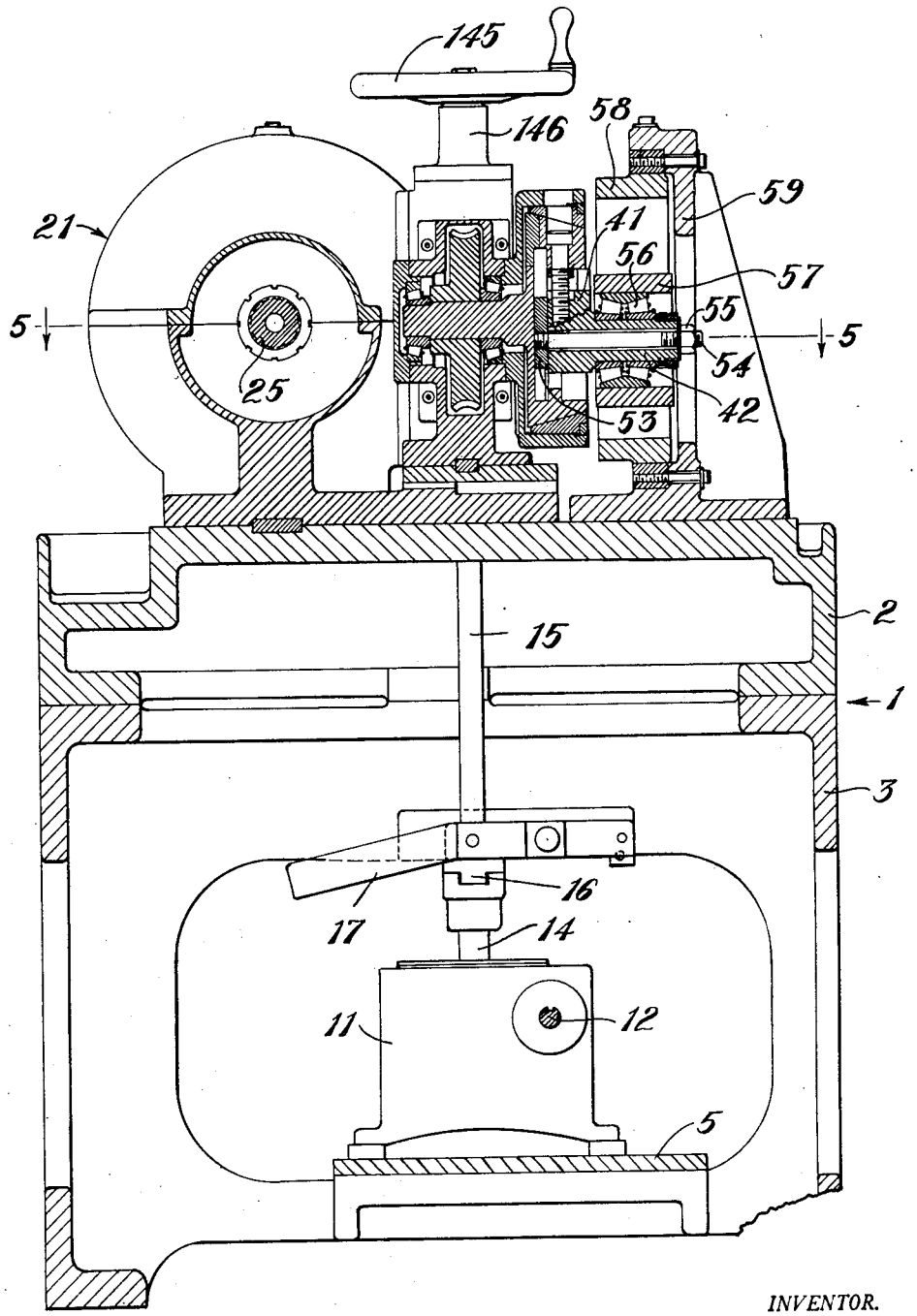
Figure 5:
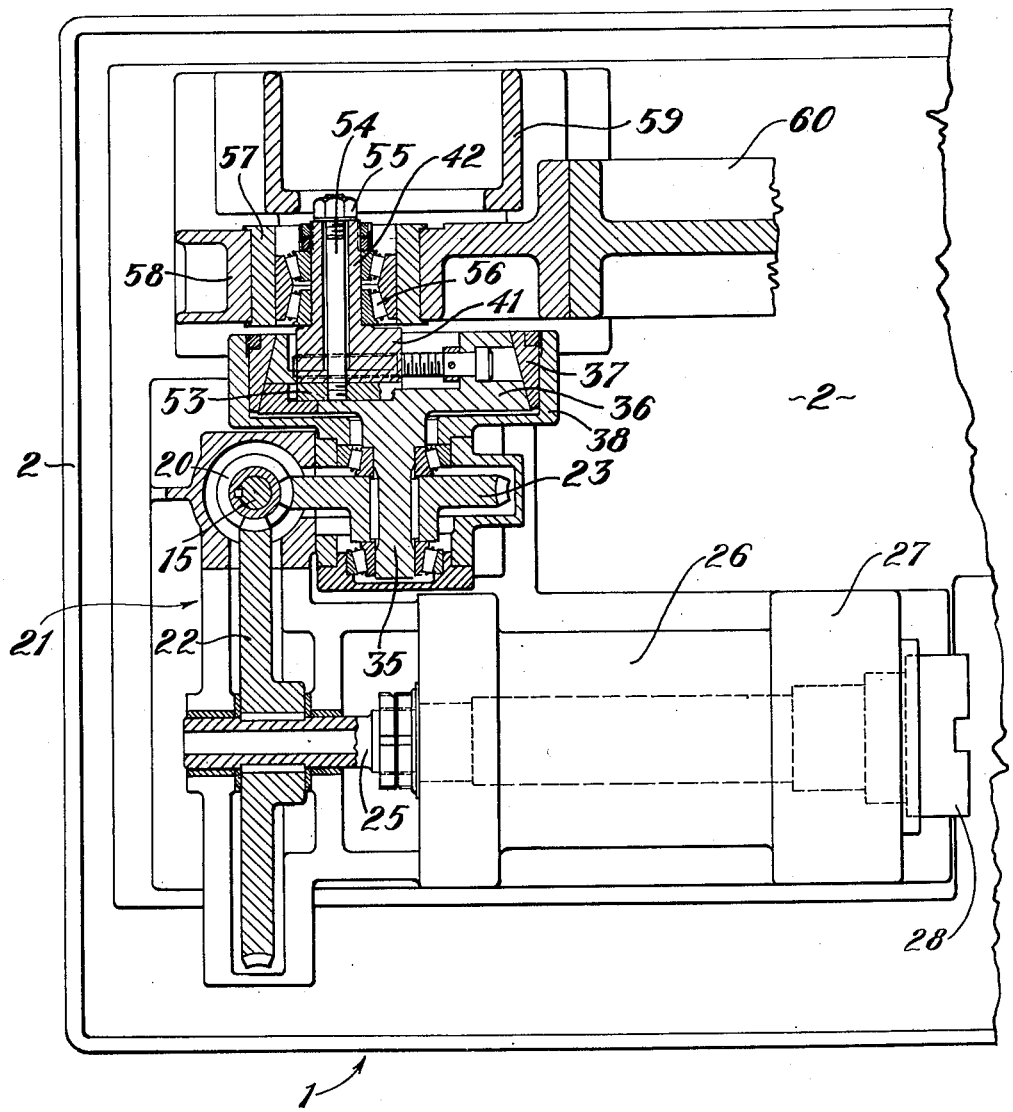
Figure 8:
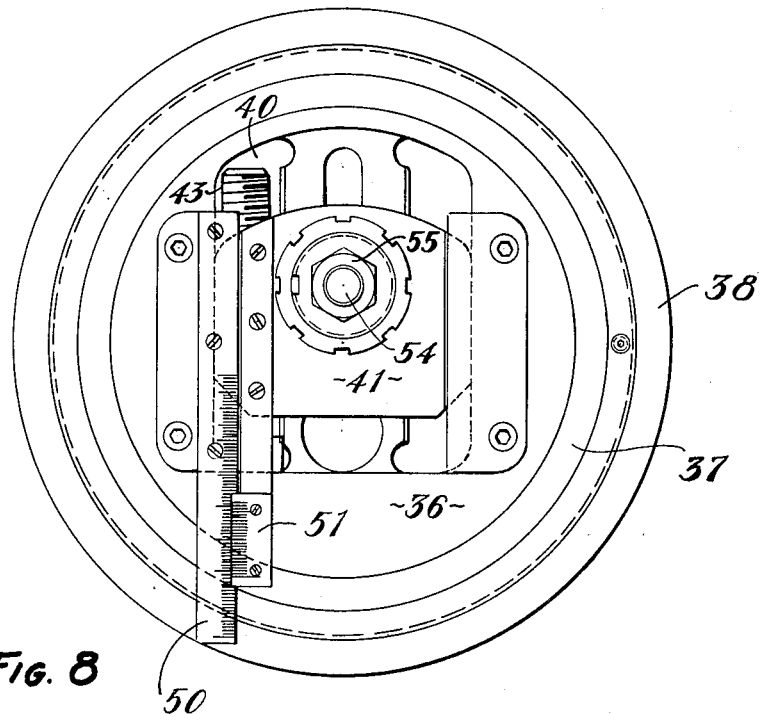
Figure 9:
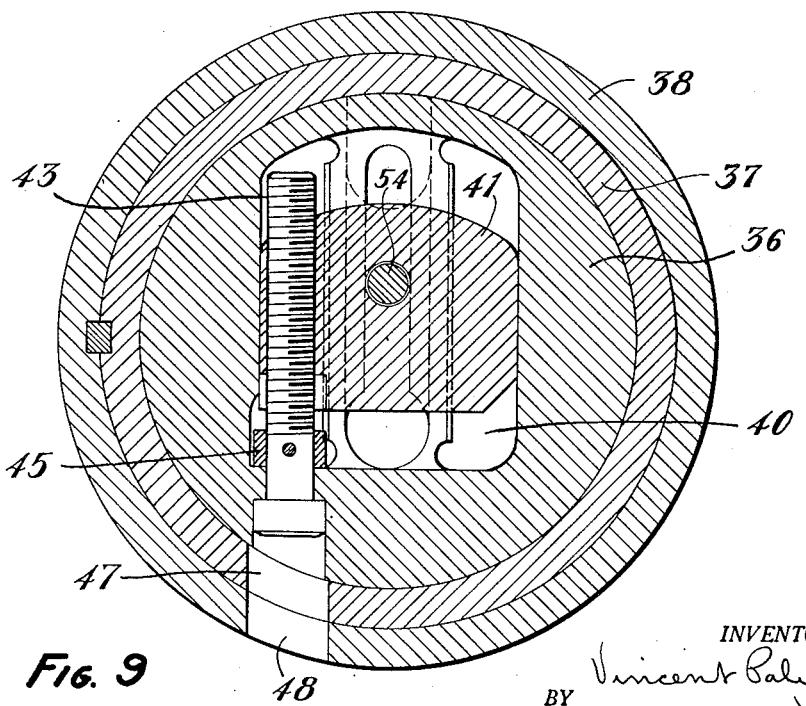

Fig. 1 is a front elevational view of a machine constructed in accordance with the invention; Fig. 2 is a plan view thereof; Fig. 3 is a fragmentary vertical longitudinal section through the machine, as indicated by the line 3—3 of Fig. 2; Fig. 4 is a vertical transverse section on the line 4—4 of Fig. 2, this and the following views being on a scale considerably enlarged over that of Figs. 1 to 3; Fig. 5 is a horizontal section through the left hand end of the machine, as the same is viewed in Figs. 1 and 2, the plane of section being indicated by the line 5—5 of Fig. 4; Fig. 6 is a vertical section from front to rear through the tool supporting carriage and associated parts, including the milling head, the plane of section being indicated by the lines 6—6 of Figs. 1 and 2; Fig. 7 is a vertical section through the grinding head that is interchangeable with the milling head shown in Fig. 6; Fig. 8 is a rear end view of the adjustable crank by which the tool supporting carriage is reciprocated, this and the following view being on a further enlarged scale; and Fig. 9 is a vertical section through the adjustable crank in a plane parallel to that of the elevational view of Fig. 8.

Similar numerals refer to similar parts throughout the several views.

The frame of the machine, designated generally by the reference numeral 1, is made up of a bed 2 and pedestals 3 and 4. On a shelf 5 in the lower part of the pedestal 3 is mounted the power unit including a prime mover, in the present instance consisting of an electric motor, designated 6, a conventional transmission 7 having a shaft 8, and gearing of common type, such as a worm and worm wheel (not shown) enclosed in a gear box 11. The power receiving shaft 12 of the gearing is connected to the shaft 8 of the transmission by a coupling 13. The power delivery shaft 14 of said gearing extends through the top of the gear box 11, and supported by the frame of the machine in alignment with the shaft 14 is a shaft 15 that has a separable driving connection with the shaft 14 through a clutch 16, the operating lever of which is designated 17. Some distance above the bed 2, the shaft 15 has secured to it a worm 20 (Fig. 5), the worm occupying a cavity in a part of a gear casing that surmounts the left hand end of the machine bed and is designated generally by the reference numeral 21. Enclosed by other parts of said casing are worm wheels 22 and 23 that mesh with the worm 20, the former wheel, in the present construction, being twice the size of the wheel 23, giving the wheels a ratio of two to one.

The worm wheel 22 is keyed or otherwise secured to a spindle 25 that is journaled in spaced bearings of the gear casing 21 and in the ends of a housing 26 that consists of an extension of the gear casing 21. To the end of the spindle 25 remote from the worm wheel 22 and adjacent the front bearing of the spindle housing, is a face plate 28.

Adjustable along the end of the bed 2 opposite the spindle housing 26 and in axial alignment therewith is a tailstock 30 of conventional form, the same being guided in its adjustments longitudinally of the bed by a key that operates within a keyway 31. A work piece W, in the form of a cylindrical body or drum, is carried by and is non-rotatable with respect to an arbor 33 that is supported by and between the face plate 28 and the point 34 of the tailstock 30, said arbor having driving connection with the face plate in the usual manner.

The previously mentioned worm wheel 23 is keyed or otherwise fastened to the shaft 35 of a crank disk 36, and said disk rotates in an annulus 37 that is locked within a circular casing 38 that is joined to the part of the previously mentioned gear casing 21 that encloses the worm wheel 23. The crank disk is frusto-conical, tapering toward the rear, and the inner surface of the annulus 37 has a complementary taper, as best appears in Figs. 4 and 5.

By reference to Figs. 8 and 9 it will be seen that the crank disk 36 has a diametrically extending slot 40 within which is guided a block 41 that carries a crank pin 42, the same being shown as integral with said block. The block is adapted to be adjusted along the slot 40 to alter the eccentricity of the crank pin 42 with respect to the crank disk 36 by a screw 43 that is journaled adjacent its head in a part of the crank disk and is held against longitudinal movement by a collar 45 that is pinned or otherwise secured to the screw. The head of the screw 43 occupies a recess in the crank disk, and access to said head, when it is desired to turn the screw for the purpose of adjusting the block 41, is had through registering holes 47 and 48 in the annulus 37 and casing 38, respectively. As best shown in Fig. 9, the screw 43 operates in a threaded bore that extends through and along one side of the block 41, and when adjusting the block, the eccentricity of the crank pin 42 with respect to the crank disk may be ascertained at any time by reference to the scale 50 and vernier 51 that are attached, respectively, to the crank disk and block, as appears in Fig. 8. The block, with the crank pin, is secured in any position to which it is adjusted, by clamping means including a locking plate 53 (Figs. 4 and 5) and a draw bolt 54 that is extended through an axial bore of the crank pin and opens through the rear side of the block, the draw bolt having a nut 55 applied to its rear end. Pursuant to custom, the shaft 35 of the crank disk is supported through anti-friction bearings within spaced portions of the gear casing 21. Mounted on the crank pin 42, through suitable anti-friction bearings shown conventionally at 56 in Figs. 4 and 5, is a cross head 57 that operates within a yoke 58. This yoke is guided for horizontal movement in a standard 59, secured to the bed 2.

The yoke 58 is rigidly attached through the medium of a heavy bar 60 to a tool carriage designated generally by the numeral 61. This carriage includes a top frame 62, end plates 63, to one of which the aforesaid bar 60 is fastened, and front and rear plates 64 and 65, respectively, to the lower edges of which are attached bars 66. Through anti-friction bearings 67, the carriage 61 is firmly supported for easy reciprocation along a base 68 that surmounts the bed 2 and is suitably secured thereto.

The tool carriage includes a bracket that is mounted on, and is adjustable along, the frame 62, the bracket being connected to the frame by members 72 that are shaped to fit into uncut grooves formed in the front and rear members of the frame 62, the interengaging parts, in the present instance, being in the nature of a common dovetail connection. Fitted within an opening in the bottom of the bracket 70 and properly positioned thereon by a dowel 74 and secured thereto by one or more screws 75 is a plate 76 within a depending lug 77 of which is threadedly engaged a feed screw 80 that is journaled at its ends in bearings 81 on the tool carriage 61. A hand wheel 82 is fastened to one end of the screw 80 and by means of said wheel the screw may be turned to adjust the bracket 70 along the top frame of the carriage. Secured to the front of the bracket 70, in vertically spaced relation to each other, are cross bars 84 and 85, within apertures of which are fixed the upper and lower unthreaded ends of a screw 87; and guided for vertical movement within the front of the bracket is an elevator 88. Occupying a cavity 89 in the rear side of the elevator 88 is a worm wheel 90 that is mounted upon and threadedly engaged with the screw 87. An anti-friction bearing 91 is interposed between the upper end of the worm wheel 90 and the top wall 92 of the cavity 89, while a similar bearing 93 is interposed between the lower end of the hub of the worm gear and the member 94 that is applied to the bottom wall 95 of said cavity. A worm (not shown) meshes with the worm wheel 90 and its shaft is journaled in parts of the elevator structure and to the forward end of said shaft is secured a hand wheel 98 (Figs. 1 and 2). From the construction described, it will be readily understood that by turning the hand wheel 98, the worm wheel 90 may be fed along the fixed screw 87 to raise or lower the elevator 88. Said elevator includes a split sleeve 100, the spaced front edges of which, as best appears in Fig. 1, are adapted to be drawn together by bolts 101.

Adapted to occupy the split sleeve 100 are the cylindrical bodies of interchangeable milling and grinding heads shown, respectively, in Figs. 6 and 7 of the drawings. In the former view, the cylindrical body 105 of the milling head is clamped within the split sleeve 100, the same being positively locked against angular movement in the sleeve by the lowermost bolt 101 the side of which occupies a notch in said body. Journaled in the conventional manner in the body 105 is a tool spindle 106 the same being counterbored with a taper at its lower end to receive a shank 107 of an end mill 110, this tool being used to cut the groove $w'$ in the work W.

The cylindrical body 105 is formed near its upper end with a radially shallow circumferential flange 115 that bears on the top of the sleeve 100 and thus sustains the weight of the tool or milling head on the elevator 88 and applied to said body above the flange 115 is the bottom plate 116 of a gear casing which includes a top plate 117 that is suitably connected adjacent its edge with the corresponding part of the bottom plate. Within the gear casing is a relatively large spur gear 118 that is keyed or otherwise secured to the tool spindle 106 and meshes with a pinion 119 that is mounted for rotation on a stud 120 fixed to and rising from the bottom plate 116. Also mounted for rotation on the stud 120, but fixed to the pinion 119, is a gear 122 that meshes with a driving pinion 123 on the shaft 124 of a motor 125. The motor is fastened to a support 126 that depends from and is shown as formed integral with the bottom plate 116 of the gear casing.

As stated above, the tool 110 which, in the present instance, consists of an end mill, is used for cutting or roughing in the groove $w'$ of the work W; and for finishing or polishing the walls of the groove, the abrasive or grinding tool 130, shown in Fig. 7, is used. This tool is carried by a spindle 131 that is mounted, according to common practice, for rotation, in the cylindrical body 133 of the grinding head. Slidable but otherwise firmly connected to the top of the body 133 is a frame 134, that includes, and are shown as integral parts thereof, a belt guard 135, and a support 136 to which is fastened an electric motor 137. The shaft 138 of this motor has keyed or otherwise secured to it a pulley 139, and a belt 140 is engaged about the pulley 139 and a smaller pulley 141 on the upper end of the tool spindle 131. By means of a screw 142 that is threaded through a lug 143 that rises from the front portion of the enlarged upper end of the body 133, the frame 134 may be forced rearwardly with respect to the body 133 in order to tighten the belt 140.

It is apparent, from what has been described, that after the groove w' is cut in the work W by the cutting tool or end mill 110, the bolts 101 may be released, the lowest of which is withdrawn to disengage it from the body, after which, by a hoist or other suitable means, the grinding head may be lifted from the elevator 88 and by the same means, the grinding head, shown in Fig. 7, may be swung into position above the machine and lowered to project the body 133 through the split sleeve 109 after which it may be locked in place in the manner already described. When the grinding head is so emplaced, the tool 130 will be presented in accurate relation to the work excepting, possibly, for its distance from the rotating center of the work; and any adjustment needed in this respect is made through the hand wheel 98, the latter being operated for such purpose in the same manner as when it is used to gradually feed the cutting tool toward the axis of the work during the cutting operation.

In setting up the machine for doing a particular job, it may be necessary to change the throw of the crank in the manner above described, and in order to register the aligned holes 47 and 48 in the casing 38 and annulus 37 with the recess that is occupied by the head of the screw 43, the clutch 16 may be thrown out by means of the lever 17 and the shaft 15 turned by a hand wheel 145 that is fastened to the upper end of the shaft where it extends above a bearing 146 that is applied to the part of the gear casing 21 that houses the worm 20.

From the construction, it will be evident to those skilled in the art as to how the machine operates and how it is attended. Briefly, a cylindrical piece of work W is mounted upon and secured to the arbor 33, and the latter is then arranged between the point of the tailstock and the head of the spindle to which head it is fastened in the usual manner for driving.

The crank action is adjusted according to the throw required to produce undulations in the cam or other groove of the desired length, and, assuming that the cutting head is mounted on the carriage, the elevator is lowered by manipulating the hand wheel 98 until the milling cutter or tool is engaged with the work. The motor 125 is then energized to drive the tool, and current is also turned through the motor 6 of the main power unit to drive the work carrying arbor and reciprocate the carriage. As the work slowly rotates, the cutting tool will be reciprocated longitudinally thereof and initiate the cutting of the groove, and as the operation progresses the tool is moved deeper and deeper into the work by means of the hand wheel 98.

After the groove has been cut to the proper depth, the machine is stopped, and the bolts 101 are relaxed, the lower one of said bolts being withdrawn from the notch in the body 105, and, by means of a hoist or other suitable equipment, the cutting head is lifted from the machine and the grinding head (shown in Fig. 7) is mounted and locked in the elevator of the carriage. When in place, the grinding tool 130 will occupy the groove in precisely the same manner as the cutting tool head previously done, and the machine may then be operated to grind or finish the walls of the groove.

It will be understood that, when preparing the machine for cutting a cam body or other cylindrical object, the tool may be adjusted to its proper starting position longitudinally thereof by shifting the bracket 70 on the carriage frame, and this is done by means of the screw 80 that is operated by the hand wheel 82 on the end of the carriage 61.

Having thus described my invention, what I claim is:

1. In a machine of the class described, means supporting a piece of work for rotation on a horizontal axis, a carriage frame, a guide along which the carriage frame is reciprocable in a horizontal path parallel to the rotating axis of the work, a bracket adjustable along the carriage frame, a tool head sustained by the bracket and equipped with a tool disposed above the work and in the vertical plane of the rotating axis thereof, a prime mover incorporated in said head, driving connections between the prime mover and the tool, and power means for rotating the work and reciprocating the carriage frame.

2. In a machine of the class described, means supporting a piece of work for rotation on a horizontal axis, a carriage frame, a guide along which the carriage frame is reciprocable in a horizontal path parallel to the rotating axis of the work, a bracket adjustable along the carriage frame, an elevator sustained by the bracket and adjustable vertically thereof, a tool head fixed to the elevator and equipped with a tool disposed above the work and in the vertical plane of the rotating axis thereof, a prime mover incorporated in said head, driving connections between the prime mover and the tool, and power means for rotating the work and reciprocating the carriage frame.

3. In a machine of the class described, means supporting a piece of work for rotation on a horizontal axis, a work spindle connected to said means in axial alignment therewith, a tool carriage, a guide along which the carriage is reciprocable in a horizontal path parallel to the rotating axis of the work, a tool head surmounting the carriage and equipped with a tool overhanging the work in the vertical plane of the rotating axis thereof, means for moving the tool toward and from said rotating axis, a vertical drive shaft, a worm thereon, a worm wheel on the work spindle meshing with said worm, a second worm wheel meshing with the worm and disposed in a plane at substantially right angles to that of the first mentioned worm wheel, and power transmitting means of a crank-like nature driven by the second worm wheel and having operative connection with the carriage.

4. In a machine of the class described, means supporting a piece of work for rotation on a horizontal axis, a work spindle connected to said means in axial alignment therewith, a tool carriage, a guide along which the carriage is reciprocable in a horizontal path parallel to the rotating axis of the work, a tool head surmounting the carriage and equipped with a tool overhanging the work in the vertical plane of the rotating axis thereof, means for moving the tool toward and from said rotating axis, a vertical drive shaft, a worm thereon, a worm wheel on the work spindle meshing with said worm, a second worm wheel meshing with the worm and disposed in a plane at substantially right angles to that of the first mentioned worm wheel, and an adjustable crank action driven by the second worm wheel and having operative connection with the carriage.

5. In a machine of the class described, means supporting a piece of work for rotation on a horizontal axis, a work spindle connected to said means in axial alignment therewith, a tool carriage, a guide along which the carriage is reciprocable in a horizontal path parallel to the rotating axis of the work, a tool head surmounting the carriage and equipped with a tool overhanging the work in the vertical plane of the rotating axis thereof, means for moving the tool toward and from said rotating axis, a vertical drive shaft, a worm thereon, a worm wheel on the work spindle meshing with said worm, a second worm wheel meshing with the worm and disposed in a plane at substantially right angles to that of the first mentioned worm wheel, a crank member having a shaft whereon the second worm wheel is fixed, a crank pin carried by and adjustable radially of said crank member, and operative connection between the crank pin and the carriage.

6. In a machine of the class described, means supporting a piece of work for rotation on a horizontal axis, a work spindle connected to said means in axial alignment therewith, a tool carriage, a guide along which the carriage is reciprocable in a horizontal path parallel to the rotating axis of the work, a tool head surmounting the carriage and equipped with a tool overhanging the work in the vertical plane of the rotating axis thereof, means for moving the tool toward and from said rotating axis, a vertical drive shaft, a worm thereon, a worm wheel on the work spindle meshing with said worm, a second worm wheel meshing with the worm and disposed in a plane at substantially right angles to that of the first mentioned worm wheel, a crank disk having a shaft to which the second worm gear is fixed, said crank disk having a radial guideway, a block slidable in said guideway, a crank pin on the block, means for adjusting the block along the guideway of the crank disk, means for locking the block in any position of adjustment, a cross head on the crank pin, a yoke having a vertical slot wherein the cross head is slidable, a guide wherein the yoke is reciprocable in substantial alignment with the carriage, and a rigid connection between the yoke and the carriage.

VINCENT PALUMBO.

REFERENCES CITED

The following references are of record in the file of this patent:

UNITED STATES PATENTS

| Number | Name | Date |
|---|---|---|
| 882,290 | Bowen | Mar. 17, 1908 |
| 974,084 | Sarossy | Sept. 18, 1934 |
| 2,187,759 | Seybold | Jan. 23, 1940 |
| 2,188,447 | Smith | Jan. 30, 1940 |
| 2,308,546 | Savage | Jan. 19, 1943 |
| 2,360,387 | Baerwalde | Oct. 17, 1944 |
| 2,385,735 | Skelton | Sept. 25, 1945 |
| 2,495,927 | Francis | Jan. 31, 1950 |